United States Patent
Jung

(10) Patent No.: US 10,452,598 B2
(45) Date of Patent: Oct. 22, 2019

(54) APPARATUSES AND METHODS FOR AN OPERATING SYSTEM CACHE IN A SOLID STATE DEVICE

(71) Applicant: Micron Technology, Inc., Boise, ID (US)

(72) Inventor: Juyoung Jung, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 310 days.

(21) Appl. No.: 15/296,188

(22) Filed: Oct. 18, 2016

(65) Prior Publication Data

US 2018/0107595 A1 Apr. 19, 2018

(51) Int. Cl.
G06F 12/0866 (2016.01)
G06F 13/42 (2006.01)
G06F 13/28 (2006.01)
G06F 12/02 (2006.01)

(52) U.S. Cl.
CPC ...... *G06F 13/4282* (2013.01); *G06F 12/0246* (2013.01); *G06F 12/0866* (2013.01); *G06F 13/28* (2013.01); *G06F 2212/205* (2013.01); *G06F 2212/214* (2013.01); *G06F 2212/313* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 5,586,291 A | 12/1996 | Lasker et al. | |
| 8,458,402 B1* | 6/2013 | Karnik | G06F 12/0897 |
| | | | 711/118 |
| 8,645,594 B2* | 2/2014 | Foong | G06F 12/063 |
| | | | 710/31 |
| 9,081,691 B1 | 7/2015 | Gupta et al. | |
| 9,298,615 B2* | 3/2016 | Olson | G06F 12/0802 |
| 2011/0010514 A1* | 1/2011 | Benhase | G06F 3/061 |
| | | | 711/162 |
| 2011/0072192 A1 | 3/2011 | Sartore | |
| 2013/0191578 A1* | 7/2013 | Goss | G06F 12/0804 |
| | | | 711/102 |
| 2014/0372657 A1 | 12/2014 | Jones et al. | |
| 2016/0232112 A1 | 8/2016 | Lee | |
| 2017/0242799 A1* | 8/2017 | O'Krafka | G06F 12/10 |

OTHER PUBLICATIONS

International Search Report and Written Opinion from related patent application No. PCT/US2017/055845, dated Jan. 23, 2018, 14 pp.

* cited by examiner

*Primary Examiner* — Elias Mamo
(74) *Attorney, Agent, or Firm* — Brooks, Cameron & Huebsch, PLLC

(57) ABSTRACT

The present disclosure includes apparatuses and methods for an operating system cache in a solid state device (SSD). An example apparatus includes the SSD, which includes an In-SSD volatile memory, a non-volatile memory, and an interconnect that couples the non-volatile memory to the In-SSD volatile memory. The SSD also includes a controller configured to receive a request for performance of an operation and to direct that a result of the performance of the operation is accessible in the In-SSD volatile memory as an In-SSD main memory operating system cache.

14 Claims, 3 Drawing Sheets

APPARATUSES AND METHODS FOR AN OPERATING SYSTEM CACHE IN A SOLID STATE DEVICE

TECHNICAL FIELD

The present disclosure relates generally to solid state devices, and more particularly, to apparatuses and methods for an operating system cache in a solid state device.

BACKGROUND

In some implementations, a solid state drive may be utilized only for data storage. As such, the solid state drive may be accessed only when data stored therein is requested by an operating system to enable performance of a function directed by the operating system. However, accessing the data in the solid state drive, accompanied by transfer of the data to a host, may be associated with an access latency and/or transfer time that may contribute to a length of time for performance of the function.

DETAILED DESCRIPTION

Figure 1:
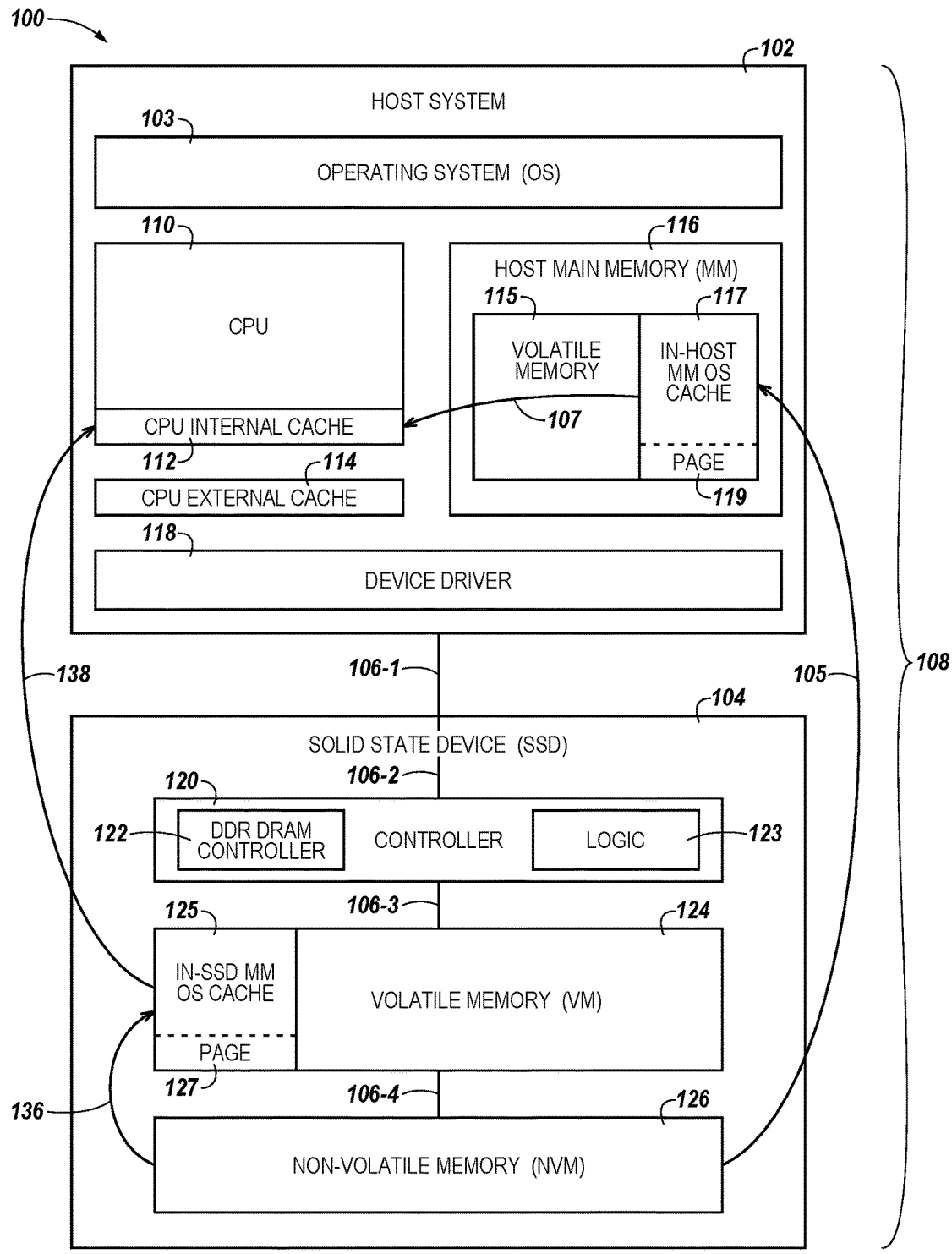
FIG. 1 is a block diagram of a computing system that includes an operating system cache in a solid state device in accordance with a number of embodiments of the present disclosure.

The present disclosure includes apparatuses and methods for a main memory (MM) operating system (OS) cache, e.g., as shown at 125 and 225-0, 225-1, . . . , 225-N–1 and described in connection with FIGS. 1 and 2A-2B, respectively, in a solid state device (SSD), e.g., an "In-SSD MM OS cache". An example apparatus includes the SSD, which, in various embodiments, includes a volatile memory (VM), e.g., an In-SSD VM 124 to distinguish from host VM 115, a non-volatile memory (NVM) 126, and an interconnect 106-4 that couples the NVM to the In-SSD VM. The SSD also may include a controller configured to receive a request for performance of an operation and to direct that a result of the performance of the operation is accessible in the In-SSD MM OS cache of the In-SSD VM. An In-host MM OS cache 117 in a host MM 116 and the In-SSD MM OS cache 125 in the In-SSD VM 124 may each form portions of the host MM 116 addressable by an OS 103 in a host system 102.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X", "Y", "N", "M", etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of", "at least one", and "one or more" (e.g., a number of memory arrays) can refer to one or more memory arrays, whereas a "plurality of" is intended to refer to more than one memory array. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 108 may reference element "04" in FIG. 1, and a similar element may be referenced as 204 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram of a computing system 100 that includes an In-SSD MM OS cache 125 in a SSD 104 in accordance with a number of embodiments of the present disclosure. As illustrated in FIG. 1, the computing system 100 may include a host system 102 that includes OS 103. In some embodiments, the OS 103 may be configured as a system software component. The OS 103 may, in various embodiments, be associated with a central processing unit (CPU) 110.

The host system 102 may include, as illustrated in FIG. 1, the CPU 110, the OS 103, a number of caches 112, 114, and a host main memory (MM) 116, which may include the host VM 115 and, in some embodiments, a host NVM (not shown). The host VM 115 may include an In-host MM OS cache 117, which itself may include a number of In-host MM OS page caches 119. The host VM 115 in the host MM 116, along with the In-host MM OS cache 117 and/or the In-host MM OS page caches 119 included in the host VM 115, may be addressable by the OS 103 and/or the CPU 110. For example, a page of data, e.g., 4 kilobytes to 2 megabytes, may be moved 107 from an In-host MM OS page cache 119 of the In-host MM OS cache 117 to CPU internal cache 112 to enable processing by the CPU 110. As such, the CPU internal cache 112 may be termed a processor cache. The CPU internal cache 112 may, in various embodiments, include a Level 1 (L1) cache, a L2 cache, and/or a L3 cache. A CPU external cache 114 may be a L4 cache. In some embodiments, the CPU internal cache 112 may be static random access memory (SRAM), whereas the host MM 116, including the host VM 115 and the In-host MM OS cache 117, may be dynamic random access memory (DRAM).

The host system 102 may be configured in various embodiments, as described herein. For example, the host system 102 may include the CPU 110, which may execute encoded instructions stored by the OS 103. The host system 102 may further include the number of caches 112 internal to the CPU 110, the number of caches 114 external to the CPU 110, the host MM 116, including the host VM 115, the In-host MM OS cache 117, the In-host MM OS page caches 119, and/or a device driver 118. The host MM 116 may function as the main memory for the host system 102.

The computing system 100 also may include at least one SSD 104 connected to the host system 102 and/or the OS 103 by an interconnect 106-1, as described herein. The SSD 104 can, in various embodiments, include a number of components. In some embodiments, the OS 103 and the interconnect 106-1 may be operated as part of an interface circuitry 108 (e.g., a PCIe circuit) with the at least one SSD 104 representing one of a number of memory devices that may each include at least one In-SSD VM 124 and at least one NVM 126, as described herein. Each SSD 104 may include a controller 120 configured to receive requests (commands) for performance of operations issued from the OS 103, e.g., via interconnect 106-1 coupled to interconnect 106-2. The controller 120 also may be configured to direct performance of the operations, e.g., via interconnect 106-3 and/or interconnect 106-4, using data cached and/or stored by the In-SSD VM 124 and the NVM 126, e.g., coupled by interconnect 106-4. The controller 120 also may be configured to output results and/or notification, e.g., confirmation, of performance of the operations to the OS 103, e.g., via interconnect 106-2 coupled to interconnect 106-1.

A distributed computing architecture, as described herein, may include the use of interface circuitry 108 that interconnects distributed components of the computing system 100, e.g., as described in connection with FIG. 1. A communication interface, e.g., referred to herein as an interconnect and shown at 106-1, 106-2, 106-3, and 106-4, may communicate via a logical connection. An interconnect 106 may provide a point-to-point communication channel between, for example, a port of a first electronic component and a port of a second electronic component, e.g., among a plurality of ports of the first and second electronic components of the distributed computing architecture. The interconnect 106 may allow both ports to send and/or receive requests, e.g., for movement of data between components, storing and/or caching of data in one or more of the components, performance of read and/or write operations on data stored by, e.g., stored in, a cache, and/or performance of read and/or write operations on data stored by, e.g., stored in, a memory, among other requests. In some embodiments, the read and/or write operations may be performed on data stored at least temporarily in one or more OS caches in the SSD 104, e.g., In-SSD MM OS cache in In-SSD VM 124 as shown at 125 and 225-0, 225-1, . . . , 225-N–1 and described in connection with FIGS. 1 and 2A-2B, respectively. The interconnect 106 also may allow both ports to send and/or receive results of performance of requested operations, e.g., results of the cache read and/or write operations, the memory read and/or write operations, among results of other operations.

For instance, the computing system 100 may use a peripheral component interconnect express (PCIe) bus including a number of interconnects 106 to interconnect the various components into an interface (e.g., PCIe) circuit, as indicated by reference number 108 in FIG. 1. In order for a PCIe peripheral memory device, e.g., SSD 104, to be addressable, the peripheral memory device may first be mapped into an input/output (I/O) port address space or a memory-mapped address space of the computing system 100. The computing system's firmware (not shown), device drivers 118, SSD controllers 120, and/or the OS 103, e.g., a part of the computing system 100 shown and described in connection with FIG. 1, may be used to program the mapping of the peripheral memory device. For example, the mapping may be programmed to a base address register (not shown) to inform the peripheral memory device of its address mapping by writing configuration commands to a PCIe controller (not shown).

For example, a PCIe can be a serial expansion interface circuit (bus) that may provide improvements over, for example, PCI, PCI-X, and AGP (Accelerated Graphics Port) bus standards, among others. Such improvements may include higher bus throughput, lower I/O pin count and a smaller physical footprint, better performance-scaling for bus devices, more detailed error detection and reporting mechanisms, and/or native hot-plug functionality. As used herein, a higher bus throughput is intended to mean using the interface circuitry 108 to increase a speed and/or rate and/or to reduce a latency of data and/or command movement within and/or between components described herein, e.g., OS 103, device driver 118, SSD 104, controller 120, In-SSD MM OS cache 125, In-SSD VM 124, and/or NVM 126, among other components. Embodiments described herein make reference to PCIe for simplicity. However, as one of ordinary skill in the art would appreciate, other interface circuitry and/or interconnects are contemplated, e.g., PCI, among others.

The PCIe interface circuitry 108 may, for example, be a high-speed serial interconnect bus using shared address/data lines. Accordingly, a PCIe bus may differ from other PCI buses in its bus topology. For instance, a PCI bus may use a shared parallel bus architecture, where the PCI host and all devices share a common set of address/data/control lines. Because of this shared bus topology, access to a PCI bus may be arbitrated in the case of multiple masters and may be limited to one master at a time in a single direction. In contrast, a PCIe bus may be based on a point-to-point topology with separate serial links connecting every device to a root complex (or host).

As used herein, data movement is an inclusive term that includes, for instance, copying, transferring, and/or transporting data values from a component in a source location to a component in a destination location. Data can, for example, be moved from the NVM operating as a data storage resource, e.g., as shown at 126 and 226 and described in connection with FIGS. 1 and 2A-2B, respectively, to a host system 102 and/or an In-SSD MM OS cache 125 for performance of an operation directed by OS, e.g., as shown at 103 and 203 and described in connection with FIGS. 1 and 2A-2B, respectively. The data can, as described herein, be moved via the In-SSD VM 124 operating as an In-SSD MM OS cache resource, e.g., as shown at 224 and described in connection with FIGS. 2A and 2B. The In-SSD MM OS cache resource 224 may, as described herein, also be configured, e.g., formed, to be included in the SSD and coupled to, e.g., via interconnect 106-4, the NVM data storage resource 226 of the SSD 204. The NVM 126 and/or the NVM data storage resource 226 may, in some embodiments, be NAND memory and/or 3D) XPoint memory operated as secondary storage in relation to primary storage of the host MM 116 and the In-SSD MM OS cache resource 224.

Copying the data values is intended to indicate that the data values at least temporarily stored and/or cached in a source component, e.g., NVM 126 and/or In-SSD MM OS cache 125 of In-SSD VM 124, are moved to the destination component, e.g., to In-SSD MM OS cache 125 of In-SSD VM 124, to In-host MM OS cache 117 of host MM 116, and/or to CPU internal cache 112, and that the original data values stored, e.g., in a row and/or cache of the source component, may remain unchanged. Transferring the data values is intended to indicate that the data values at least temporarily stored and/or cached in a source component are moved to the destination component and that at least one of the original data values stored, e.g., in the row and/or cache of the source component, may be changed, e.g., by being erased and/or by a subsequent write operation, as described herein. Transporting the data values is intended to indicate the process by which the copied and/or transferred data values are moved. For example, the data values can be transported via an interconnect 106 of the interface circuitry 108, as described herein, from being stored and/or cached in the source location to the destination location.

For clarity, description of the computing system 100 has been simplified to focus on features with particular relevance to the present disclosure. For example, in various embodiments, there may be more than one OS 103 and/or more than one SSD 104 operating as an In-SSD MM OS cache resource 224 coupled to, e.g., via interconnect 106-4, an NVM data storage resource 226 of the SSD 204. In some embodiments, the In-SSD MM OS cache resource 224 may be a dynamic random access memory (DRAM) array operating as a portion of the host MM 116, although other configurations of volatile memory are within the scope of the present disclosure, e.g., a static random access memory (SRAM) array, a synchronous dynamic random access memory (SDRAM), and/or thyristor random access memory (TRAM), among others. The data storage resource described herein is intended to be the NVM 126 of the SSD 104. In some embodiments, the NVM 126 may be a 3D XPoint array, although other configurations of non-volatile memory are within the scope of the present disclosure, e.g., a spin torque transfer random access memory (STT RAM) array, a phase change random access memory (PCRAM) array, a resistive random access memory (RRAM) array, a NAND flash array, and/or a NOR flash array, among others.

As described herein, a 3D XPoint array is intended to mean a three-dimensional cross-point array of memory cells for an SSD that is configured for non-volatile data storage and for reduced latency of data access and/or retrieval. The latency may be reduced relative to other non-volatile memory, e.g., NAND flash memory, among others, to a level approaching the relatively short latency achievable with volatile memory (e.g., DRAM). For example, a 3D XPoint array may, in various embodiments, operate as NVM 126 in combination with In-SSD VM 124, e.g., a DRAM array, via interconnect 106-4. Coupling the NVM 126 to the In-SSD VM 124 via interconnect 106-4 may further contribute to increasing the speed and/or rate and/or to reducing the latency of data movement between these components.

Such In-SSD VM and NVM resources in the SSD 104 each may, in various embodiments, include memory cells arranged in rows coupled by access lines (which may be referred to as word lines or select lines) and columns coupled by sense lines (which may be referred to as data lines or digit lines). In some embodiments, the plurality of memory arrays of the memory resources may be partitioned to enable operations to be performed in parallel in one or more partition.

In at least one embodiment, the host system 102 may include the OS 103 running on the CPU 110. The OS 103 may be configured to request, by issuance of a command and/or directing performance of, e.g., via one or more processors, various operations, such as the read operation and/or the write operation described herein. In addition to a L1 cache, the present disclosure may, in various embodiments, utilize combinations of at least one of three other levels of cache, such as L2, L3, and/or L4. The L1, L2, L3, and/or L4 caches each may contribute to bridging a gap between a fast CPU 110 and a slower secondary memory, e.g., In-SSD VM 124 and/or NVM 126 configured without the In-SSD MM OS cache 125 and/or the interface circuitry 108 described herein. The host system 102 can, in some embodiments, include a number of internal caches 112 as part of the CPU 110. For example, L1, L2, and/or L3 caches may be built into the CPU, e.g., as the CPU internal caches 112. In various embodiments, an L2 cache or an L3 cache may be a last level cache (LLC) in the CPU internal cache 112 hierarchy.

Alternatively or in addition, the host system 102 can include a number of CPU external caches 114 that are external to the CPU 110. The internal and/or external caches may be configured as memory to at least temporarily store data retrieved from the memory resources, e.g., In-SSD VM 124 and/or NVM 126, of the SSD 104 in order to be used by the CPU 110 in performance of a number of operations, such as the read operation described herein. For example, a L1, L2, and/or L3 cache hierarchy in the CPU internal caches 112 may store data that is frequently and/or recently accessed by the CPU 110. When data requested by the CPU 110 are not found in the respective internal cache hierarchy, the CPU external caches 114 may be checked to determine if the requested data are cached therein. The CPU external cache(s) 114 may, in various embodiments, include one or more of various types of caches. The CPU external cache(s) 114 may contribute to a multi-level storage strategy for computer performance. Caches such as L4 may be located external to the CPU (as the CPU external caches 114), for example, off-chip and/or built into a motherboard, among other locations.

If the requested data are not cached in the CPU internal caches 112, CPU external caches 114, and/or the In-host MM OS cache 117 of the host MM 116, a storage access request may be sent (issued) via the OS 103 to the device driver 118. As described herein, the request may be sent (forwarded) by the device driver 118 to the controller 120 of the SSD 104 to retrieve 136 the data from, for example, NVM 126. The controller 120 may implement the request, e.g., a software routine call, by retrieval of the requested data from an In-SSD MM OS cache 125 in the In-SSD VM 124 of the SSD 104. The In-SSD MM OS cache 125 may include a number of In-SSD MM OS page caches 127. The In-SSD MM OS cache 125 and/or the In-SSD MM OS page caches 127 included in the In-SSD VM 124 may be addressable by the OS 103 as a portion of the host MM 116. For example, data from the In-SSD MM OS page caches 127 may be sent directly 138 to the CPU internal cache 112 at a granularity of, for example, 64 bytes for processing by the CPU 110. By comparison, access of data to be directly sent 105 from the NVM 126 to the host system 102 may have a granularity of 512 bytes or higher. Accordingly, data may be sent directly 138 with an increased speed, rate, and/or efficiency from the In-SSD MM OS cache 125 to the CPU internal cache 112, rather than by initiating an operation to directly send 105 the requested data from the NVM 126 to a cache of the host system 102, e.g., to In-host MM OS cache 117 of the host MM 116.

For example, in some pre-existing implementations, such a request may initiate retrieval of such data directly 105 from the NVM 126, e.g., from 3D) XPoint memory, among other types of NVM, for movement of the data via a dual in-line memory module (DIMM) to the In-host MM OS cache 117 of host MM 116 for performance of operations. However, such a data movement path has reduced speed and/or rate and/or an increased latency of data movement relative to the OS 103 directing access of such data for movement from an In-SSD MM OS cache 125 of the In-SSD VM 124 rather than directly from the NVM 126. For example, the reduced speed and/or rate may be at least partially due to an increased intrinsic latency for the host system 102 and/or device driver 118 accessing the NVM 126, e.g., the 3D XPoint memory, relative to accessing data having been moved 136 from the NVM 126 to the In-SSD MM OS cache 125 of the In-SSD VM 124 in the SSD 104 via the interface circuitry 108, e.g., accessing the cached data via interconnects 106-1, 106-2, and/or 106-3.

The host system 102 may, in some embodiments, include a number of buffers (not shown) as part of, or external to, the CPU 110. The buffers may be memory configured to accumulate data, for example, as received from the CPU 110, and move the data to the memory resources of the SSD 104 in performance of a number of operations, such as a write operation. As described herein, the host system 102 also may include a primary memory resource. The primary memory resource may include the CPU internal caches 112, the CPU external cache(s) 114, the host VM 115 and/or the In-host MM OS cache 117 of the host MM 116.

The SSD 104 includes, for example, a combination of In-SSD VM 124, NVM 126, and a controller 120 to direct operations performed using data stored and/or cached by these volatile and non-volatile memories, along with the interconnects 106-2, 106-3, and/or 106-4 of the interface circuitry 108 described herein. The In-SSD MM OS cache 125 and In-SSD MM OS page caches 127 described herein may be considered a portion of the primary memory resource.

In some embodiments, the controller 120 of the SSD 104 may include a double data rate (DDR) SDRAM controller 122. Compared to single data rate (SDR) SDRAM, the DDR SDRAM interface may provide, for example, higher data movement, e.g., transfer, rates by stricter control of the timing of the electrical data and/or clock signals. The DDR SDRAM may use double pumping for transfer of data on both the rising and falling edges of the clock signal to double data bus bandwidth without a corresponding increase in clock frequency. One advantage of keeping the clock frequency down is that it may reduce signal integrity requirements on the circuit board, for example, for connecting memory, e.g., In-SSD VM 124 and/or NVM 126, to the controller 120. The "double data rate" refers to the DDR SDRAM operated with a particular clock frequency being able to have nearly twice the bandwidth of a SDR SDRAM running at the same clock frequency due to the double pumping. For example, with data being transferred 64 bits at a time, the DDR SDRAM enables a transfer rate of (memory bus clock rate)×2 (for double data rate)×64 (number of bits transferred)/8 (number of bits/byte). Thus, with a memory bus clock rate, e.g., bus frequency, of 100 megahertz (MHz), the DDR SDRAM may enable a transfer rate of 1600 megabytes per second (MB/s).

The controller 120 may, in various embodiments, be associated with and/or include logic circuitry 123. The logic circuitry 123 may be configured to include a number of processing resources, e.g., one or more processors, which may retrieve and execute instructions and/or store the results of the executed instructions at a suitable location. A processor can include a number of functional units such as arithmetic logic unit (ALU) circuitry, floating point unit (FPU) circuitry, and/or a combinatorial logic block, for example, which can be used to execute instructions by performing an operation on data, e.g., one or more operands. As used herein, an operation can be, for example, a Boolean operation, such as AND, OR, NOT, NOT, NAND, NOR, and XOR, and/or other operations, e.g., invert, shift, arithmetic, statistics, comparison of operation attributes to a number of thresholds to determine selection of a resultant operation from a number of options, among many other possible operations.

A time and/or power advantage may be realized by increasing a speed, rate, and/or efficiency of data being moved around and stored in a computing system in order to process requested memory array operations. Such operations may include compute operations, such as reads and/or writes, etc., as DRAM operations and/or logical operations, such as logical Boolean operations, determination of data movement operations, etc., among others described herein.

The controller 120 may be coupled to the logic circuitry 123. The controller 120 and/or the logic circuitry 123 may be associated with and/or include a number of caches, buffers, sense amplifiers, compute components, extended row address (XRA) latches, and/or registers, which may be associated with arrays of memory cells, e.g., In-SSD VM 124 and/or NVM 126, via control lines and/or data paths, e.g., as shown in FIGS. 2A-2B. The controller 120 may direct and/or control regular DRAM compute operations for the In-SSD VM array 124, such as a read, write, copy, and/or erase operations, etc. Additionally, however, instructions retrieved, stored, and/or executed by the logic circuitry 123 of controller 120 may cause performance of additional logical operations, such as, for example, addition, multiplication, threshold comparison, or Boolean operations such as an AND, OR, XOR, etc., which are more complex than regular DRAM read and write operations.

In various embodiments, the computing system 100 can include a device driver 118. The device driver 118 can be configured to perform at least the functions described herein in connection with sending requests from the OS 103 to the SSD 104 and/or receiving results and/or notification, e.g., confirmation, of performance of the operations from the SSD 104, e.g., from controller 120. In some embodiments, host system 102 can include the device driver 118, although embodiments are not so limited. For example, the device driver 118 for the SSD 104 may, in some embodiments, be disposed on the SSD 104 itself or elsewhere in the computing system 100. In embodiments in which the device driver 118 is disposed on the host system 102, the device driver 118 can be selectably coupled to the CPU 110 and/or OS 103 and selectably coupled via bus 106 to the SSD 104. For example, at least one device driver 118 may be configured to selectably couple to a controller 120 in each SSD 104, e.g., via interconnects 106-1 and/or 106-2 of interface circuitry 108, to provide instructions related to usage of the CPU internal caches 112, the CPU external caches 114, VMs 124, In-SSD MM OS caches 125, NVMs 126, and/or cache attributes, as described herein. In addition, the controller 120 may be configured to control access to memory resource VMs 124 and/or NVMs 126 of each SSD 104, as described herein, in response to instructions received from the device driver 118.

As used herein, host system 102, OS 103, CPU 110, a number of caches 112 internal to the CPU 110, a number of caches 114 external to the CPU 110, host MM 116, host VM 115, In-host MM OS cache 117, In-host MM OS page caches 119, device driver 118, at least one SSD 104, interconnects 106, interface circuitry 108, controller 120, In-SSD VM 124, In-SSD MM OS cache 125, In-SSD MM OS page caches 127, DDR SDRAM controller 122, logic component 123, and/or NVM 126 might be separately or collectively considered an "apparatus."

Figure 2A:
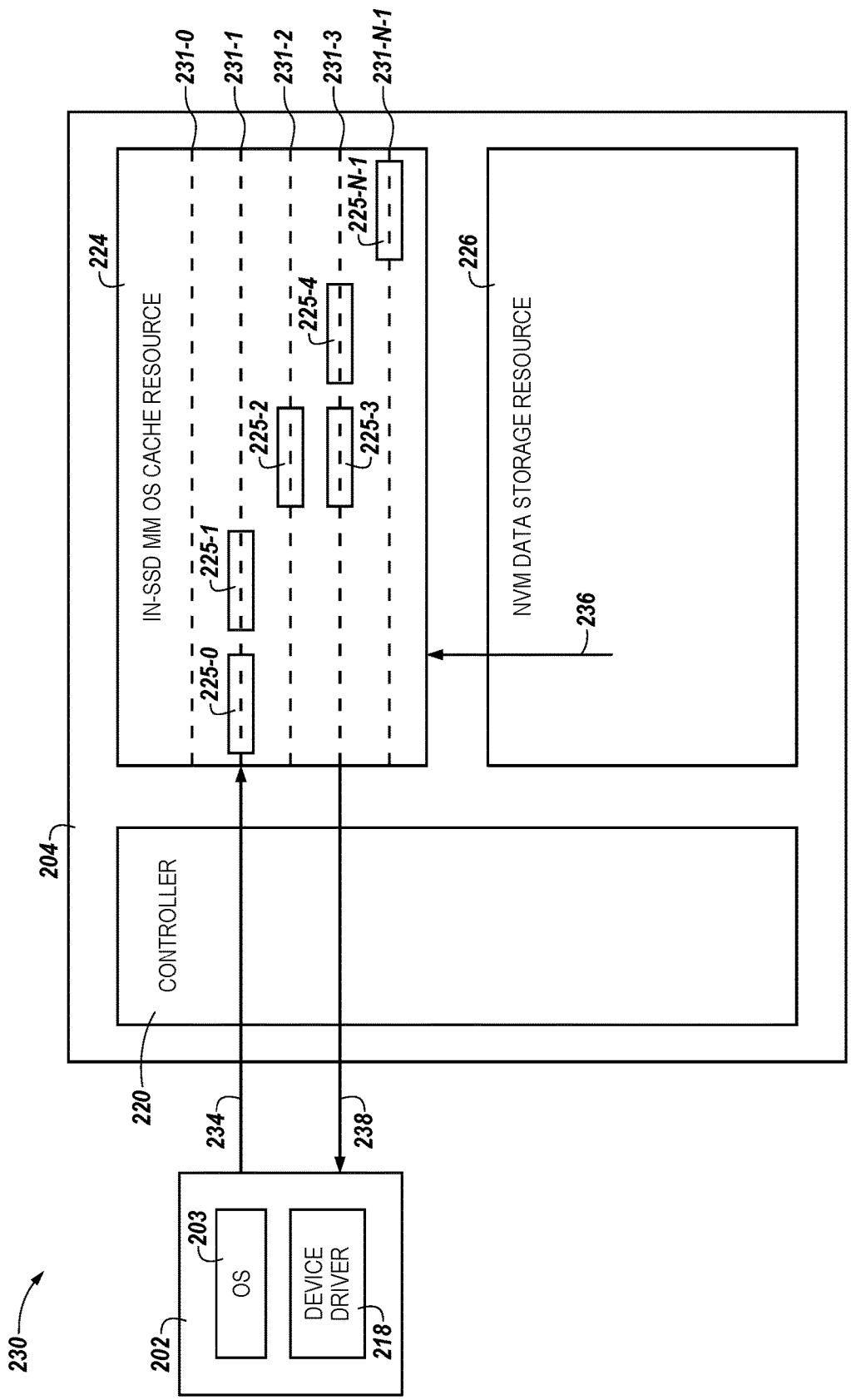
FIG. 2A is a diagram illustrating a path for a data movement operation in accordance with a number of embodiments of the present disclosure.

FIG. 2A is a diagram illustrating a path 230 for a data movement operation in accordance with a number of embodiments of the present disclosure. The host system 202, OS 203, device driver 218, SSD 204, controller 220, In-SSD MM OS cache resource 224, In-SSD MM OS caches 225-0, 225-1, . . . , 225-5, and/or NVM data storage resource 226 components shown in FIGS. 2A and 2B may correspond to and/or be embodiments of the components in FIG. 1 that are similarly numbered, except for beginning with the digit "1" in FIG. 1. Moreover, although CPU 110, caches 112 internal and/or caches 114 external to the CPU 110, host MM 116, interconnects 106, and interface circuitry 108, among other components shown or described in connection with FIG. 1 are not shown in FIGS. 2A and 2B for the interest of clarity, one or more of such components may be included in the circuitry illustrated in FIGS. 2A and 2B. As such, each of these components may, in various embodiments, represent at least a portion of the functionality embodied by and contained in the corresponding components shown and described in connection with FIG. 1 and elsewhere herein.

As previously stated, data movement is an inclusive term that includes, for instance, copying, transferring, and/or transporting data values. An example of a path for data movement may, in various embodiments, include a requested block of data being moved 236 from the NVM data storage resource 226 to at least one of the In-SSD MM OS caches 225-0, 225-1, . . . , 225-N–1 in the In-SSD MM OS cache resource 224. The request may include addresses of one or more blocks of data stored by the NVM data storage resource 226 and the one or more blocks of data may be moved from the NVM data storage resource 226 to one or more of the In-SSD MM OS caches 225-0, 225-1, . . . , 225-N–1.

Each of the In-SSD MM OS caches 225-0, 225-1, . . . , 225-N–1 may correspond to a number of memory cells in a row, e.g., rows 231-0, 231-1, . . . , 231-N–1, and/or a column (not shown) of the In-SSD MM OS cache resource 224, e.g., a DRAM array. The size of each In-SSD MM OS cache, e.g., the number of memory cells therein, may be fixed or variable, e.g., depending of the number of bits in the requested data.

When more than one In-SSD MM OS cache is utilized to cache the requested data, the caches may be arranged in various manners in a memory array of the In-SSD MM OS cache resource 224. For example, a plurality of In-SSD MM OS caches, e.g., 225-0 and 225-1, may be positioned in a single row, e.g., row 231-0, contiguously and/or with unutilized memory cells between the In-SSD MM OS caches anywhere in row 231-0, e.g., as selected by OS 203. In some embodiments, the plurality of In-SSD MM OS caches, e.g., 225-2 and 225-3, may be similarly positioned in two or more rows, e.g., rows 231-2 and 231-3, that are vertically oriented. In some embodiments, the plurality of In-SSD MM OS caches, e.g., 225-4 and 225-N–1, may be similarly positioned in two or more rows, e.g., rows 231-3 and 231-N–1, that are diagonally oriented. In some embodiments, the In-SSD MM OS caches 225 may correspond to the In-SSD MM OS page caches 127 shown and described in connection with FIG. 1. Various combinations of such orientations, among others, of the In-SSD MM OS caches in the In-SSD MM OS cache resource 224 are contemplated and remain within the scope of the present disclosure.

Being configured to cache requested blocks and/or portions of the requested blocks of data in In-SSD MM OS caches 225 of various sizes and/or positions, e.g., as determined by controller 220 based upon the In-SSD MM OS caches selected by OS 203, contributes to granularity of moving and/or performing operations on the requested data. For example, a single page of requested data, e.g., four kilobytes, may contain a plurality of requested blocks of data, which may, in some embodiments, be stored by a respective plurality of In-SSD MM OS caches, e.g., 225-0, 225-1, . . . , 225-N–1. Each of the requested blocks of data may correspond to a size, e.g., in bits, of one or more respective In-SSD MM OS caches in which the requested block is to be stored. In some embodiments, data stored and/or cached in the In-SSD MM OS caches may be accessed for movement directly 138 to the CPU internal cache 112 at a granularity of, for example, a multiple of 64 bytes (512 bits), among other possibilities, which may correspond to a size of a CPU processor cache line. For example, although a page of data, e.g., stored by all memory cells in a row 231 of In-SSD MM OS cache resource 224 and which may correspond to thousands of bytes, may be accessed and/or moved 238, the data accessed and/or moved 238 in some situations may have a much finer granularity, e.g., 64 bytes. In some embodiments, the OS 203 may utilize an In-SSD MM OS cache look-up table (not shown), e.g., a radix tree, interfaced with In-SSD MM OS cache resource 224 and/or NVM data storage resource 226 to expedite a look-up routine. In some embodiments, the interface of the look-up table may be via DIMM.

The requested data being moved to and/or cached by particular In-SSD MM OS caches 225 selected by the OS 203 may enable a read operation to be directed by the OS 203 on the data cached in the particular In-SSD MM OS caches 225. Alternatively or in addition, the requested data being in the particular selected In-SSD MM OS caches 225 may enable a write operation to be directed by the OS 203 on the data cached in the particular In-SSD MM OS caches 225. The requested data being in the particular selected In-SSD MM OS caches 225 may enable the requested data to be moved from the selected In-SSD MM OS caches 225 to enable performance of a number of operations directed by the OS 203.

Moreover, in some embodiments, an operation, e.g., a mathematical operation, a logical operation, etc., may be performed by the SSD 204, e.g., the controller 220 and/or logic circuitry 123, to determine whether the requested data moved to and/or cached by the selected In-SSD MM OS caches 225 is to be moved to the host system 202, e.g., for storage in a cache thereof, or whether the requested data is to remain in the selected In-SSD MM OS caches 225. For example, a determination whether the requested data is to remain in the selected In-SSD MM OS caches 225 may be whether the requested data is to remain stored by the selected In-SSD MM OS caches 225, e.g., and not to be moved to the host system 202, or is to be erased, e.g., equilibrated, from the selected In-SSD MM OS caches 225, regardless of whether the selected data is moved to the host system 202.

In the path 230 illustrated in FIG. 2A, a request 234 for a block of data, e.g., based upon an initiated user application that uses the data for performance of an application operation, may be sent from the OS 203, e.g., via device driver 218, to open and read the block of data, e.g., a data file, stored by the NVM data storage resource 226, e.g., a 3D XPoint array. The OS 203 may direct creation of a number of In-SSD MM OS caches 225 in the In-SSD MM OS cache resource 224 before, essentially simultaneously with, and/or after sending the request 234 for the block of data to the NVM data storage resource 226. The OS 203 may direct movement 236, e.g., copy, transfer, and/or transport operations, of requested blocks of data from the NVM data storage resource 226 into a number of selected In-SSD MM OS caches 225, e.g., a page cache, for caching the requested data in response to a read and/or a write call, e.g., consistent with a particular cache attribute, as described herein. The selected In-SSD MM OS cache 225 may store and/or cache the requested block of data for access by and/or movement 238 to the host system 202 to enable performance of the operation. In various embodiments, sending the request 234, creation of the In-SSD MM OS caches 225 in the In-SSD MM OS cache resource 224, movement of the block of data from the NVM data storage resource 226, and/or the access by and/or the movement 238 to the host system 202 may be controlled and/or directed by the device driver 218 and/or the controller 220.

A routine performed by OS 203 may determine, e.g., by receiving a cache miss signal, that a requested block of data to enable performance of an operation is not stored by a readily accessible cache, e.g., a CPU internal cache 112, a CPU external cache 114, and/or In-host MM OS cache 117 of the host MM 116. The routine may then determine, e.g., by receiving a cache hit signal, that the requested block of data is stored and/or cached in an In-SSD MM OS cache 225 of In-SSD MM OS cache resource 224 in SSD 204, e.g., as a result of previously being moved 236 from NVM data storage resource 226. Hence, OS 203 may directly access the block of data in and/or direct movement 238 of the block of data from the In-SSD MM OS cache 225, e.g., for use by a number of processors of CPU 110. In some embodiments, blocks of data may be sequentially accessed in and/or moved from an In-SSD MM OS cache 225 and/or a plurality of In-SSD MM OS caches, e.g., 225-0, 225-1, . . . , 225-N−1.

Among differences between the present disclosure and transferring requested data to DIMM memory from an SSD storage device is, for example, that an initial destination of the requested block of data is, as described herein, an In-SSD MM OS cache 225 of SSD 204 configured as a portion of the host MM 116. Unconditionally transferring the requested block of data to the In-host MM OS cache 117 of the host MM 116 via the DIMM that is not part of the SSD 204, e.g., the DIMM being connected to a motherboard of a computing device, notably contrasts with moving the requested block of data initially to an In-SSD MM OS cache 225 that is a portion of the host MM 116 prior to selectably moving the requested block of data to at least one of the additional primary memory resources in the host system 202. As described herein, the requested block of data may be moved directly 138 from the In-SSD MM OS cache 125 to the CPU internal cache 112 operating as the processor cache for CPU 110. Alternatively or in addition, in various embodiments, the requested block of data may be moved from the In-SSD MM OS cache 125 to the CPU external cache(s) 114 and/or the In-host MM OS cache 117 of the host MM 116, as described herein.

For example, there may be a shorter distance between NVM data storage resource 226 and the In-SSD MM OS cache 225 in In-SSD MM OS cache resource 224, which may contribute to a shorter access latency and/or movement time, than movement directly 105 between the NVM data storage resource 226 and the In-host MM OS cache 117 of the host MM 116 that is addressable by the OS 203, e.g., when connected by the DIMM. Accessing the requested data from an In-SSD MM OS cache 225 in In-SSD MM OS cache resource 224 of the SSD 204 may have a shorter intrinsic latency, e.g., 50 nanoseconds (ns), than accessing the requested data directly from the NVM data storage resource 226, e.g., 100-500 ns. Latency of accessing the data directly from the NVM data storage resource 226 may be further affected by whether a read or a write operation is to be performed on the data. As such, accessing the requested data in the In-SSD MM OS cache 225, e.g., for performance of a read operation or a write operation, may further contribute to reducing the intrinsic latency.

Figure 2B:
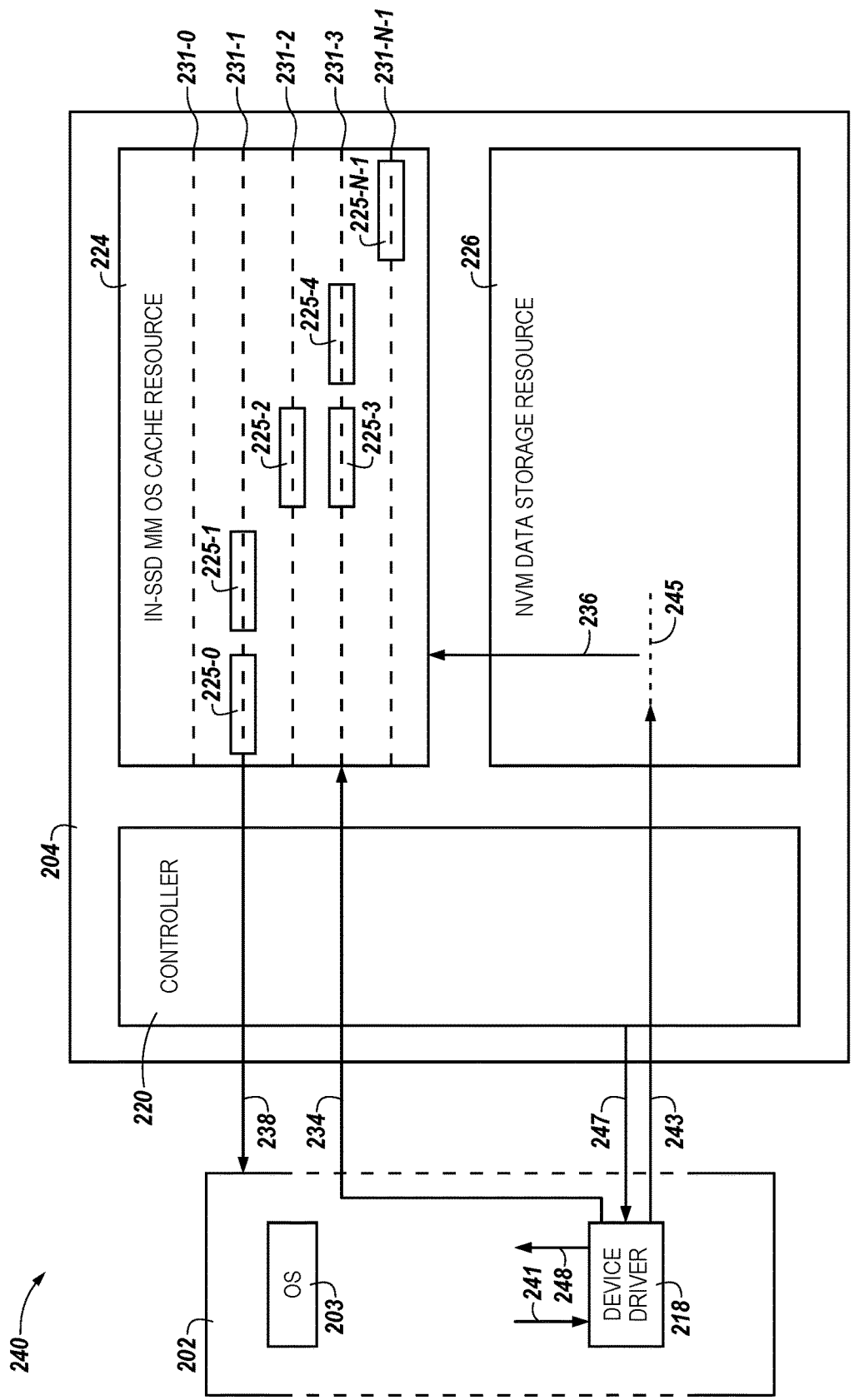
FIG. 2B is a diagram illustrating another path for a data movement operation in accordance with a number of embodiments of the present disclosure.

FIG. 2B is a diagram illustrating another path 240 for a data movement operation in accordance with a number of embodiments of the present disclosure. The host system 202, OS 203, device driver 218, SSD 204, controller 220, In-SSD MM OS cache resource 224, In-SSD MM OS caches 225-0, 225-1, . . . , 225-5, and/or NVM data storage resource 226 components shown in FIG. 2B may correspond to the components in FIGS. 1 and 2A that are similarly numbered. As such, each of these components may, in various embodiments, represent at least a portion of the functionality embodied by and contained in the corresponding components shown and described in connection with FIGS. 1 and 2A and elsewhere herein.

The path 240 shown in FIG. 2B illustrates an example of a requested block of data not being previously stored and/or cached by an In-SSD MM OS cache 225 of the In-SSD MM OS cache resource 224, e.g., as determined by the OS 203 and/or device driver 218 receiving a cache miss signal in response to a request 234 for the block of data. In response, in some embodiments, the OS 203 may initiate an I/O routine for the requested block of data with output 241 of an address of the requested block of data, e.g., block 245, in the NVM data storage resource 226 and/or output of requests and/or instructions (commands) for operations performed on the requested block of data, as directed by the device driver 218. Some embodiments may be configured for input 248 of the requested data to primary memory resources in the host system 202, as described herein, e.g., host MM 116 addressable by the OS 203, as directed by the device driver 218.

Such commands can direct movement 236 of a number of blocks 245 of the requested data from the NVM data storage resource 226 to a number of selected In-SSD MM OS caches, e.g., 225-0, 225-1, . . . , 225-N−1, in the In-SSD MM OS cache resource 224 of the SSD 204. The device driver 218 may, in some embodiments, direct performance of data movement into, within, and/or from the SSD 204 via the controller 220 of the SSD 204 being selectably coupled to the In-SSD MM OS cache resource 224 and the NVM data storage resource 226. For example, the controller may direct the movement 236 of the requested data from the NVM data storage resource 226 to the In-SSD MM OS cache resource 224, e.g., rather than directly 105 to the In-host MM OS cache 117 of the host MM 116 addressable by the OS 203, as may be done in other implementations.

Movement of the requested data to the selected In-SSD MM OS caches 225 in the In-SSD MM OS cache resource 224 may result in the I/O routine updating look-up table information to document a location of the moved data, e.g., in which of In-SSD MM OS caches 225-0, 225-1, . . . , 225-N−1 the moved data is cached. In various embodiments, as described herein, the requested data may remain in the documented location before, during, and/or after the requested data is moved to a cache of the host system 202 and/or regardless of whether the requested data is moved to the cache of the host system.

Accordingly, in various embodiments, the present disclosure can be implemented as follows. Note that operations indicated, for example, in FIGS. 2A and 2B may be performed sequentially and/or substantially simultaneously because performance of the respective illustrated paths 230 and 240 may be individually controlled via the controller 220 of the SSD 204 and/or the device driver 218 associated with the OS 203. Accordingly, various operations may be performed in parallel via cooperation of hardware, firmware, and/or software. Among other advantages, such parallel performance of the operations may expedite performance of an associated path, e.g., paths 230 and 240.

In various embodiments, an SSD 204, as described herein, can include In-SSD MM OS cache resource 224, NVM data storage resource 226, and an interconnect 106-3, e.g., as shown and described in connection with the interface (e.g., PCIe) circuitry 108 of FIG. 1, that couples the NVM to the VM. The SSD also may include the controller 220 configured to receive a request 234 for performance of an operation and to direct that a result of the performance of the operation is accessible in the In-SSD MM OS cache resource 224 as an In-SSD MM OS cache 225. The device driver 218 may send the request 234 to the controller 220. The request 234 may be received by the controller 220 from the device driver 218 associated with the OS 203. The request 234 may include a block address 243 for a block of data 245 stored by the NVM data storage resource 226.

The request 234 may, in various embodiments, include a cache attribute. As described herein, a cache attribute is intended to refer to one of a number of caching options for storing a copy of data at least temporarily in a storage medium, e.g., for performance of operations by a processor. In various embodiments, the storage medium may be one or more In-SSD MM OS caches, e.g., as shown at 125 and 225-0, 225-1, . . . , 225-N–1 and described in connection with FIGS. 1 and 2A-2B, respectively, and the processor may be a CPU, e.g., as shown at 110 and described in connection with FIG. 1. The In-SSD MM OS caches may be more readily accessible by the processor than bulk storage of the data, for example, in NVM data storage resource 226 of the SSD 204. Examples of the cache attributes may include write combining (WC), write protected (WP), write back (WB), write through (WT), write around (WA), strong uncacheable (UC), and/or uncacheable (UC–), among other options known in the art.

A cache attribute may be assigned to and/or included in a request 234 for a read operation. For example, the cache attribute may be set to WP cacheable, e.g., in the CPU internal caches 112, the CPU external caches 114, the In-host MM OS cache 117 of the host MM 116. and/or in the In-SSD MM OS caches 225 of the In-SSD MM OS cache resource 224. A cache attribute may be assigned to and/or included in a request 234 for a write operation. In some requests for a write operation, the cache attribute may be set to WC for use with, for example, a write combining buffer (not shown). In some requests for a write operation, the cache attribute may be set to WB for use with, for example, a write operation performed in the In-SSD MM OS caches 225 of the In-SSD MM OS cache resource 224 and a write back of the written data to the CPU internal caches 112, the CPU external caches 114, the In-host MM OS cache 117 of the host MM 116, and/or to the NVM data storage resource 226.

When a read operation is requested, the device driver 218 and/or controller 220 may determine that a read request has been issued and may relay a command for performance of the read operation based upon the associated cache attribute. In situations where a write operation is requested, the device driver 218 and/or controller 220 may determine that a write request has been issued and may relay a command for performance of the write operation based upon the associated cache attribute.

Accordingly, in response to a first assigned cache attribute in a request 234, the controller 220 may be configured to direct that a read operation be performed on the data moved to the In-SSD MM OS cache 225 in the In-SSD MM OS cache resource 224, e.g., DRAM. In response to a second assigned cache attribute in a request 234, the controller 220 may be further configured to direct that a write operation be performed on the data moved to the In-SSD MM OS cache 225 in the In-SSD MM OS cache resource 224, e.g., DRAM, where the first assigned cache attribute is different from the second assigned cache attribute.

Because data for a read operation retrieved from, for example, the NVM data storage resource 226 of the SSD 104 may be cached in an In-SSD MM OS cache 225 associated with the In-SSD MM OS cache resource 224, a processing speed of the data may be improved. For example, the processing speed may approximate a speed of the data being provided to a processor of CPU 110 from host MM 116, e.g., DRAM. Similar improvement in processing speed may be achieved for a write operation.

As described herein, the SSD 204 may, in some embodiments, include DRAM, e.g., a number of DRAM arrays, as the In-SSD MM OS cache resource 224 and a 3D XPoint memory as the NVM data storage resource 226. The controller 220 may be configured to receive a request 234 for movement of data stored by the SSD 204 and to direct that the requested data is moved 236 to an In-SSD MM OS cache 225 in the DRAM. The moved data may be stored as a block of data in the In-SSD MM OS cache resource 224, e.g., in one or more In-SSD MM OS caches 225-0, 225-1, . . . , 225-N–1, as described herein. For example, the In-SSD MM OS cache may be positioned in a single row and/or a single column of memory cells in the DRAM or, in some embodiments, be positioned across a plurality of rows and/or columns, e.g., diagonally.

In some embodiments, a PCIe bus may be utilized as a communication interface between OS 203, device driver 218, controller 220, and the DRAM to form a PCIe circuit, e.g., as interface circuitry 108 including interconnects 106-1, 106-2, and 106-3. The PCIe bus may further be utilized as a communication interface between the DRAM and the 3D XPoint memory, e.g., via interconnect 106-4, to form the PCIe circuit.

The controller 220 may be further configured to direct that a requested block of data 245 be moved from the block address in the NVM data storage resource 226 to a selected In-SSD MM OS cache in the In-SSD MM OS cache resource 224, e.g., selected by OS 203 from In-SSD MM OS caches 225-0, 225-1, . . . , 225-N–1. In some embodiments, performance of the operation can include movement of data stored by the NVM data storage resource 226 to the In-SSD MM OS cache resource 224 and storage of the data by the In-SSD MM OS cache 225.

The controller 220 may be further configured to selectably move a result of the operation, e.g., a read and/or write operation, from the In-SSD MM OS cache 225 of the In-SSD MM OS cache resource 224 to the host system 202. As described herein, to selectably move the result of the operation is intended to include to select between movement of the result for storage in a cache, e.g., In-host MM OS cache 117, of the host system 202 and movement of the result to a cache internal to, e.g., CPU internal cache 112, a processing resource, e.g., CPU 110, of the host system 102, without being stored by the internal cache, to enable performance of a particular operation directed by the OS 203.

The controller 220 may be further configured to notify 247 the OS 203, e.g., via device driver 218, that a block of requested data is moved 236 from the NVM data storage resource 226 to the In-SSD MM OS cache 225 in the In-SSD MM OS cache resource 224. The controller 220 may be further configured to notify 247 the OS 203, e.g., via device driver 218, that the performance of the operation is completed.

The controller 220 may be further configured to receive the request 234 for data stored by the SSD 204, to determine from the request that the requested data is stored 245 at a block address in the NVM data storage resource 226, e.g., the 3D XPoint memory, to direct movement 236 of the requested data from the block address in the 3D XPoint memory to an In-SSD MM OS cache 225 in the DRAM, and to direct storage of the requested data by the In-SSD MM OS cache 225 in the DRAM. The controller 220 may be further configured to receive a request 234 for data stored by the In-SSD MM OS cache 225 in the DRAM and to direct movement of the data from the In-SSD MM OS cache 225 to enable performance of a particular operation, as directed by the OS 203 that requested the data. The request 234 for the data stored by the In-SSD MM OS cache 225 in the DRAM may be received from the OS 203 and/or CPU 110. The requested data may be moved 238 from the In-SSD MM OS cache 225 to the host system 202, e.g., to a CPU internal cache 112 and/or a CPU external cache 114 to enable processing by the CPU 110.

Prior to the request 234 being sent for movement of the requested data stored by the In-SSD MM OS cache 225 in the DRAM, the OS 203 may be configured to determine that the requested data is not stored by a cache of the host system 202, e.g., by receiving a cache miss signal, and to determine that the requested data is stored by the In-SSD MM OS cache 225 in the DRAM, e.g., by receiving a cache hit signal. Alternatively or in addition, prior to movement of the requested data from the block address in the 3D XPoint memory, the controller may be configured to determine that the requested data is not presently stored by an In-SSD MM OS cache 225. If the requested data is presently stored by the In-SSD MM OS cache 225 or the requested data is moved 236 to an In-SSD MM OS cache 225, the controller 220 may be further configured to notify 247 the OS 203 that a block of requested data is accessible in the In-SSD MM OS cache 225. In some embodiments, the controller 220 may be further configured, as described herein, to direct movement 238 of the requested data from the In-SSD MM OS cache 225 to the host system 202 to enable processing by execution of instructions stored by the OS 203. For example, the requested data may be moved directly 238 to a processor cache, e.g., CPU internal cache 112, of the host system 202 to enable performance of a particular operation and the requested data is not sent to and/or stored by another cache of the host system 202, e.g., CPU external cache 114 and/or In-host MM OS cache 117.

Accordingly, the controller 220 may be further configured to co-manage the In-SSD MM OS cache resource 224, e.g., DRAM, among other types of VM, and the NVM data storage resource 226, e.g., 3D XPoint memory, among other types of NVM, for data migration as directed by the OS 203. In some embodiments, the controller 220 may include logic circuitry 123, e.g., as shown in and described in connection with FIG. 1. The logic circuitry 123 may be configured to determine whether a request 234, received from the OS 203, for particular data stored by the SSD 204 meets a threshold, e.g., by a threshold comparison operation. The threshold may be applied to an operation attribute, which may be selected from a number of operation attributes. The operation attributes may include, for example, a number of requests, a frequency of requests, e.g., in a particular length of time, a size of a request, e.g., defined by a number of bits, a timing of a request, e.g., in a particular time frame, for the particular data, and/or a free memory capacity of a host system, e.g., a low free memory capacity may affect whether the data is retained in a particular In-SSD MM OS cache 225 rather than being moved to the host system 202, among other possible operation attributes.

The controller 220 and/or the logic circuitry 123 may be further configured to determine, if the request does not meet, e.g., is lower than, a first threshold, that the requested data be moved from a particular In-SSD MM OS cache 225 in the In-SSD MM OS cache resource 224 to the host system 202 to enable performance, e.g., by the CPU 110 connected to the OS 203, of the particular operation and that the requested data not be stored by a cache of the host system 202, e.g., a number of the CPU internal caches 112, CPU external caches 114, and/or In-host MM OS cache 117 during and/or after performance of the operation. In some embodiments, the requested data may remain stored by the particular In-SSD MM OS cache 225 when the requested data is not stored by a cache of the host system 202. Hence, a destination for storage of the requested data may be the particular In-SSD MM OS cache 225.

If the request does meet, e.g., is equal to or higher than, the first threshold, the controller 220 and/or the logic circuitry 123 may be further configured to determine that the requested data be moved from the particular In-SSD MM OS cache 225 to be stored by a cache of the host system 202, e.g., a number of the CPU internal caches 112, CPU external caches 114, and/or In-host MM OS cache 117. In some embodiments, when the request does meet the first threshold, the requested data may not remain stored by the particular In-SSD MM OS cache 225 when the requested data is moved to and/or stored by a cache of the host system 202. Hence, a destination for storage of the requested data may be a particular cache of the host system 202.

Alternatively or in addition, the controller 220 and/or the logic circuitry 123 may be further configured to determine, if the request does not meet, e.g., is lower than, a second threshold, that the requested data be moved from a particular In-SSD MM OS cache in the In-SSD MM OS cache resource 224 to the host system 202 to enable performance, e.g., as directed by the OS 203, of a particular operation and that the requested data not be stored thereafter by the particular In-SSD MM OS cache 225. As such, in some embodiments, the requested data may not remain stored by the particular In-SSD MM OS cache 225 when the request does not meet the second threshold and the requested data is not stored by a cache of the host system 202 by not meeting the first threshold. Hence, the requested data may not be stored by either the particular In-SSD MM OS cache 225 or a cache of the host system 202, although the requested data remains stored by the NVM data storage resource 226.

If the request does meet, e.g., is equal to or higher than, the second threshold, the controller 220 and/or the logic circuitry 123 may be further configured to determine that the requested data be stored thereafter by the particular In-SSD MM OS cache 225 to enable access by the OS 203 of the host system 202 to the stored requested data. Hence, a destination for storage of the requested data may be the particular In-SSD MM OS cache 225.

The second threshold, among any number of thresholds, may apply to an operation attribute that is the same as or is different from that of the first threshold. In some embodiments, the first threshold for a particular operation attribute may have a higher numerical value or other rating indicative of utilization of the requested data by the OS 203 than indicated by the second threshold. For example, if a number of requests for the requested data meets the first threshold, the requested data may be stored by a cache of the host system 202, rather than remaining stored by the particular In-SSD MM OS cache 225 when the number does not meet the first threshold. Meeting a lower second threshold for the number of requests may be used to determine that the requested data remain stored by the particular In-SSD MM OS cache 225, whereas not meeting second threshold for the number of requests may be used to determine that requested data is not stored by either the particular In-SSD MM OS cache 225 or the cache of the host system 202. In some embodiments, a particular threshold may be determined for each type of request, e.g., for data movement, a read operation, and/or a write operation.

Embodiments described herein provide a method of operating a first apparatus that may be in the form of the computing system 100 including OS 203, In-SSD MM OS cache resource 224, In-SSD MM OS caches 225, NVM data storage resource 226, and interface circuitry 108, among other possible components, e.g., as shown in and described in connection with FIGS. 1 and 2A-2B. In various embodiments, the computing system 100 may include DRAM operating as the In-SSD MM OS cache resource 224, coupled to 3D XPoint memory as the NVM data storage resource 226, operating as the secondary data storage resource, and the interface circuitry 108, e.g., a PCIe bus, operating as the communication interface between the OS 203, the DRAM In-SSD MM OS cache resource 224, and the 3D) XPoint memory data storage resource 226. The method can, as described herein, include utilizing the first apparatus for shortening a latency of data movement, for an operation performed utilizing the first apparatus, relative to a same type of operation performed by a second apparatus.

In various embodiments, the type of operation may be selected from a data movement operation, a read operation, and/or a write operation, among others. Shortening the latency relative to the operation performed by the second apparatus can include utilizing the second apparatus configured such that the DRAM is not interconnected to the 3D XPoint memory via the PCIe bus. Alternatively or in addition, shortening the latency can include utilizing the second apparatus configured to access data in the 3D XPoint memory via a memory bus for movement to a DIMM, e.g., in contrast to the first apparatus being configured for the OS 203 to access data in the DRAM via the PCIe bus.

In some embodiments, shortening the latency relative to the same type of operation performed by the second apparatus can include shortening a write operation performed on data stored by the DRAM In-SSD MM OS cache resource 224. For example, the interface circuitry 108 described herein may be utilized to enable performance of a write operation on data stored by an In-SSD MM OS cache 225, which may contribute to performance of the write operation, and to enable subsequent movement of the result to a cache of the host system 202, e.g., a CPU internal cache 112, a CPU external cache 114, and/or In-host MM OS cache 117. Such a WB operation may be performed in approximately half the time utilized by the second apparatus having the NVM data storage resource 226, e.g., the 3D) XPoint memory, directly connected by the DIMM for transfer of an equivalent number of data bits to L1, L2, L3, and/or L4 caches and/or the In-host MM OS cache 117.

The present disclosure may provide benefits compared to other approaches that use 3D XPoint memory. Utilization of the computing system 100 described herein may help overcome potential problems with "dirty" cache lines. For example, dirty cache lines, e.g., L1, L2, L3, L4, In-host MM OS cache 117, and/or victim caches, may store data values that differ from corresponding data values stored by the 3D XPoint memory. In contrast, the In-SSD MM OS caches 225 described herein may cache data values retrieved directly from the 3D XPoint memory such that the data values stored by the In-SSD MM OS caches 225 are the same as the data values stored by the 3D XPoint memory.

Accordingly, the present disclosure describes a SSD 204 that provides both primary memory functions as an In-SSD MM OS cache resource 224 and secondary storage functions as an NVM data storage resource 226. The SSD 204 configured as such, in combination with the interface circuitry 108 described herein, may expedite retrieval of blocks of data requested by the OS 203, e.g., when a cache miss signal is received by OS 203. The SSD 204 configured as such enables co-management, of the In-SSD MM OS cache resource 224, e.g., DRAM, and the NVM data storage resource 226, e.g., 3D XPoint memory. In various embodiments, the devices driver 218 and/or controller 220 described herein may contribute to the co-management by directing data migration requested by the OS 203.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a solid state device (SSD), wherein the SSD comprises:
        an In-SSD volatile memory;
        a non-volatile memory;
        an interconnect that couples the non-volatile memory to the In-SSD volatile memory; and
        a controller configured to:
            receive a request for performance of an operation;

direct that a requested block of data be moved from a block address in the non-volatile memory to an In-SSD main memory (MM) operating system cache in the In-SSD volatile memory;

direct that a result of the performance of the operation is accessible in the In-SSD volatile memory as the In-SSD MM operating system cache;

notify a device driver, associated with an operating system, that the requested block of data is moved from the non-volatile memory to the In-SSD MM operating system cache in the In-SSD volatile memory; and notify the operating system that the performance of the operation is completed.

2. The apparatus of claim 1, wherein:
the request is received from a device driver; and
the device driver is associated with an operating system.

3. The apparatus of claim 1, wherein:
the request comprises a block address for a block of data stored by the non-volatile memory; and
a device driver sends the request to the controller.

4. The apparatus of claim 1, wherein the controller is further configured to selectably move the result of the operation from the In-SSD MM operating system cache of the In-SSD volatile memory to a host system.

5. The apparatus of claim 4, wherein to selectably move the result of the operation comprises to select between:
movement of the result for storage in a cache of the host system; and
movement of the result to a cache internal to a processing resource of the host system, without being stored by the cache, to enable performance of a particular operation directed by the operating system.

6. The apparatus of claim 1, wherein the performance of the operation comprises:
movement of data stored by the non-volatile memory to the In-SSD volatile memory; and
storage of the data in the In-SSD MM operating system cache.

7. The apparatus of claim 1, wherein the apparatus further comprises:
an operating system configured as part of a host system, the host system comprising:
a central processing unit (CPU);
a host MM including a host volatile memory; and
an In-host MM operating system cache as part of the host volatile memory.

8. A method, comprising:
operating a solid state device (SSD), wherein the SSD comprises a controller that is configured to perform:
receiving a request for performance of an operation;
directing that a requested block of data be moved from a block address in a non-volatile memory to an In-SSD main memory (MM) operating system cache in an In-SSD volatile memory, wherein the data is moved using an interconnect that couples the non-volatile memory to the In-SSD volatile memory;

directing that a result of the performance of the operation is accessible in the In-SSD volatile memory as an In-SSD MM operating system cache;

notifying a device driver, associated with an operating system, that the requested block of data is moved from the non-volatile memory to the In-SSD MM operating system cache in the In-SSD volatile memory; and notifying the operating system that the performance of the operation is completed.

9. The method of claim 8, further comprising receiving the request from a device driver that is associated with an operating system.

10. The method of claim 8, further comprising:
including in the request a block address for a block of data stored by the non-volatile memory; and
sending, by a device driver, the request to the controller.

11. The method of claim 8, wherein the controller is further configured to perform selectably moving the result of the operation from the In-SSD MM operating system cache of the In-SSD volatile memory to a host system.

12. The method of claim 11, wherein selectably moving the result of the operation comprises selecting between:
movement of the result for storage in a cache of the host system; and
movement of the result to a cache internal to a processing resource of the host system, without being stored by the cache, to enable performance of a particular operation directed by the operating system.

13. The method of claim 8, wherein the performance of the operation comprises:
moving data stored by the non-volatile memory to the In-SSD volatile memory; and
storing the data in the In-SSD MM operating system cache.

14. The method of claim 8, wherein:
operating the SSD further comprises using an operating system that is part of a host system, wherein the host system comprises:
a central processing unit (CPU);
a host MM including a host volatile memory; and
an In-host MM operating system cache as part of the host volatile memory.

* * * * *